United States Patent
Shah et al.

(10) Patent No.: US 8,203,557 B2
(45) Date of Patent: *Jun. 19, 2012

(54) SYSTEM CO-PROCESSOR

(75) Inventors: Katen Shah, Folsom, CA (US); Hong Jiang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/023,562

(22) Filed: Feb. 9, 2011

(65) Prior Publication Data

US 2011/0128293 A1  Jun. 2, 2011

Related U.S. Application Data

(63) Continuation of application No. 11/648,305, filed on Dec. 29, 2006, now Pat. No. 7,907,138.

(51) Int. Cl.
*G06T 17/00* (2006.01)

(52) U.S. Cl. ........ 345/420; 345/501; 345/502; 345/503; 345/504; 345/505; 345/519; 345/520; 345/531; 345/543

(58) Field of Classification Search .................. 345/420, 345/501–505, 519, 520, 531, 543

See application file for complete search history.

(56) References Cited

U.S. PATENT DOCUMENTS

| | | |
|---|---|---|
| 5,764,479 A | 6/1998 | Crump et al. |
| 5,915,100 A | 6/1999 | Crump et al. |
| 5,915,265 A | 6/1999 | Crocker et al. |
| 6,118,462 A | 9/2000 | Margulis |
| 6,298,370 B1 | 10/2001 | Tang et al. |
| 6,822,654 B1 | 11/2004 | Trivedi et al. |
| 6,891,543 B2 | 5/2005 | Wyatt |
| 6,919,899 B2 | 7/2005 | Shiuan et al. |
| 6,985,152 B2 | 1/2006 | Rubinstein et al. |
| 7,219,085 B2 * | 5/2007 | Buck et al. ............... 706/12 |
| 7,248,261 B1 * | 7/2007 | Hakura ................. 345/426 |
| 7,289,125 B2 | 10/2007 | Diard et al. |
| 7,369,126 B1 * | 5/2008 | Hakura ................. 345/426 |
| 7,420,565 B2 | 9/2008 | Rubinstein et al. |
| 7,444,637 B2 * | 10/2008 | Pronovost et al. ........ 718/104 |
| 7,548,892 B2 * | 6/2009 | Buck et al. ............... 706/12 |
| 7,619,628 B2 | 11/2009 | White et al. |
| 7,620,530 B2 * | 11/2009 | Bordes et al. ............. 703/2 |
| 2005/0122334 A1 | 6/2005 | Boyd et al. |
| 2007/0150937 A1 | 6/2007 | Gatto et al. |
| 2008/0198169 A1 | 8/2008 | Boyd et al. |

* cited by examiner

*Primary Examiner* — Kimbinh T Nguyen
(74) *Attorney, Agent, or Firm* — Trop, Pruner & Hu, P.C.

(57) ABSTRACT

Embodiments of the invention provide assigning two different class identifiers to a device to allow loading to an operating system as different devices. The device may be a graphics device. The graphics device may be integrated in various configurations, including but not limited to a central processing unit, chipset and so forth. The processor or chipset may be associated with a first identifier associated with a graphics processor and a second device identifier that enables the processor or chipset as a co-processor.

15 Claims, 3 Drawing Sheets

SYSTEM CO-PROCESSOR

CROSS-REFERENCE TO RELATED APPLICATIONS

This application is a continuation of U.S. patent application Ser. No. 11/648,305, filed on Dec. 29, 2006 now U.S. Pat. No. 7,907,138.

BACKGROUND

Implementations of the claimed invention generally may relate to the field of video and, more particularly, to media acceleration of video streams for implementation in the short term however is applicable to a broader range of application fields like cryptography, audio acceleration, etc.

Integrated chipsets may include functionality dedicated for graphics that is either removed or disabled in a discrete graphics environment. A graphics core in an unified memory architecture integrated environment may operate in a discrete mode when there is an attached discrete graphics card. In particular, the graphics core may be disabled when a discrete card is detected in an interconnect port and graphics logic in the chipset is not used. As graphics cores have evolved, graphics gates in some of the current and upcoming configurations have moved from fixed functionality to more general purpose which can be programmed via code (for example via kernels).

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Embodiments of the invention provide assigning two different class identifiers to a device to allow loading to an operating system as different devices. The device may be a graphics device. The graphics device may be integrated in various configurations, including but not limited to a central processing unit, chipset and so forth. The processor or chipset may be associated with a first identifier associated with a graphics processor and a second device identifier that enables the processor or chipset as a co-processor.

Figure 1:
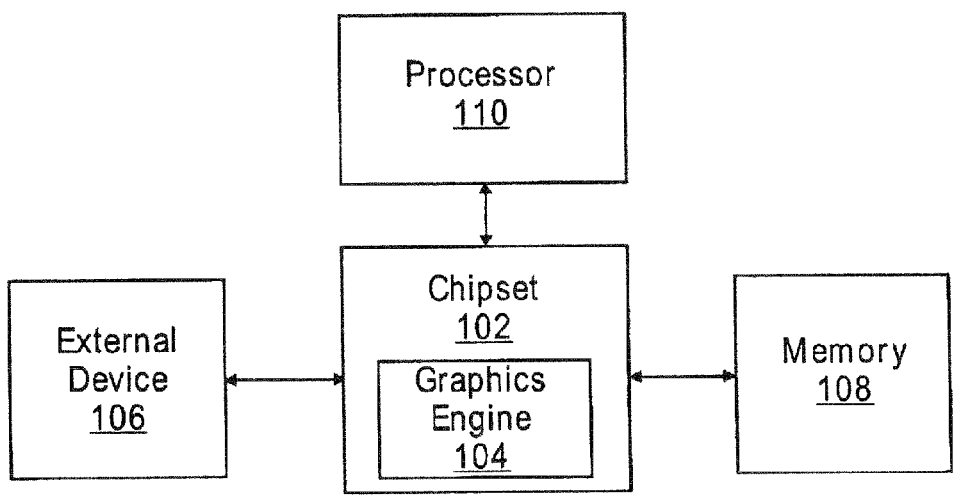
FIG. 1 illustrates an example system of an integrated graphics chipset.

FIG. 1 illustrates an example system 100 of an integrated graphics chipset configuration. Embodiments of the invention extend the utilization of the unified memory architecture for graphics to general purpose capability. This may enable usage of selected cores developed for graphics and video in the unified memory architecture integrated environment to being used in the discrete mode when there is an external device 106 such as an attached discrete graphics card. This provides an alternate use of the core logic capabilities as a co-processing device. In one example, system co-processor may be a media accelerator to speed up applications such as video (e.g., MPEG2) encode and transcode.

In operation, integrated graphics chipset 102 including graphics engine 104 may enable a second device identifier (ID) or a different class code that would enable chipset 102 as a separate device in addition to being a graphics processing core. The second device ID is used to identify the coprocessor, rather than the graphics processor. This second device may be enabled if external device 106 is detected in interconnect port. For illustrative purposes, interconnect port may be a PCI Express port. One skilled in the art will recognize that the port may be any port that allows operability between chipset 102 and external device 106.

In addition to the device ID capability in chipset 102, there may be an additional support requirement from the driver/system basic input-output system (BIOS), such as pre-allocated memory setup and memory mapped input/output (MMIO) setup. In particular, a device driver may be associated with the second device ID. The driver sets up and configures unified memory architecture (UMA) system co-processor as an accelerator device. It is possible for this general purpose capability to be a single- or multi-function.

Figure 2:
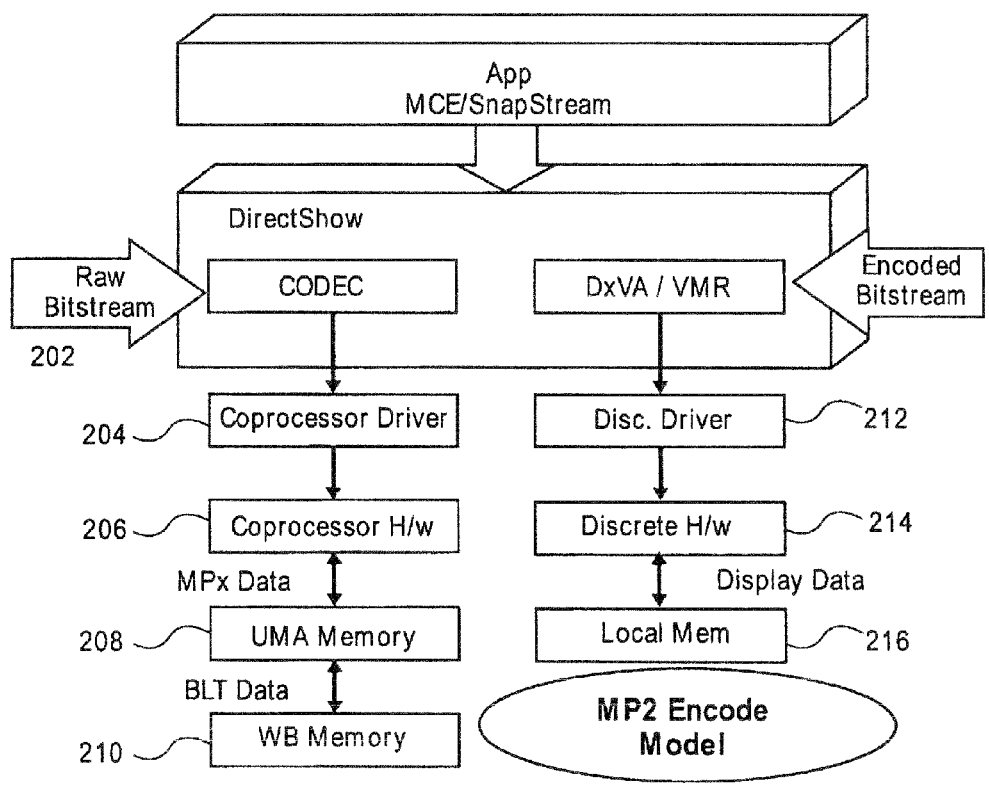
FIG. 2 illustrates an example system of a general purpose core for acceleration migrating from current model and a flow chart of a process of the acceleration.

FIG. 2 illustrates an example system 200 of a general purpose core for acceleration migrating from current model and a flow chart of a process of the acceleration. Although process may be described with regard to system 100 for ease of explanation, the claimed invention is not limited in this regard. In addition to setup and configuration of UMA system coprocessor, driver includes software to enable selected capabilities. For example, referring to FIG. 2, some application programming interfaces provide a driver model for enabling selected capabilities, such as Microsoft's DirectShow for enabling an external MPEG-2 encoder. This requires development of a MPEG-2 encoder kernel using configurations that are used to encode raw bitstream. For illustrative purposes, embodiments of the invention are discussed with respect to enabling an external MPEG-2 encoder. One skilled in the art will recognize that embodiments of the invention may be applied to enabling a variety of selected capabilities in addition to the MPEG-2 encoder.

The raw bit stream may be provided to an encoder (for example to transfer to write combining space) on a codec (act 202).

The codec kernel takes the driver in the graphics non co-processor mode (act 204) and programs the hardware to do any pre processing (act 206). The kernel pre-processes the input video and then encodes the bit stream. In particular, the hardware will have an encode kernel that will run. The output is data such as MPEG-2, MPEG-4 and so forth. For illustrative purposes, output data may be identified as MPx data although one skilled in the art will recognize that embodiments of the invention may be adapted to other configurations as well.

The encoded data may be stored and accessible through the unified memory architecture memory, such as system memory (act 208).

The encoded bit stream may then be transferred to cacheable memory (act 210). This encoded bit stream uses the normal decode process for playback (in this case on the discrete graphics add-in card). In particular, the data from memory may be blitted and stored in cacheable memory such as write back memory. The encoded bit stream may then be executed using a conventional playback process. For example, play back is executed by a discrete graphics card.

DxVA refers to the Microsoft's DirectX API that may be used to define an interface that the player uses to hardware accelerate playback of the compressed stream on the discrete graphics device.

Acts 212-216 illustrate the normal flow executed by a discrete add-in card. Normally, without an add-in card, acts 212-216 would be executed by an integrated graphics engine. A discrete add-in card would handle functions such as display and so forth.

In a typical implementation, an encoder is located on a tuner card. The CPU handles the PVR operation. The encoder encodes that data. The CPU sends the encoded data to a discrete card. The discrete card decodes and displays it. The same functionality except the encode function may be performed by the chipset rather than the tuner card. The unified memory architecture may be directed to the system functions that the CPU carries out and the additional functions that the chipset does.

Figure 3:
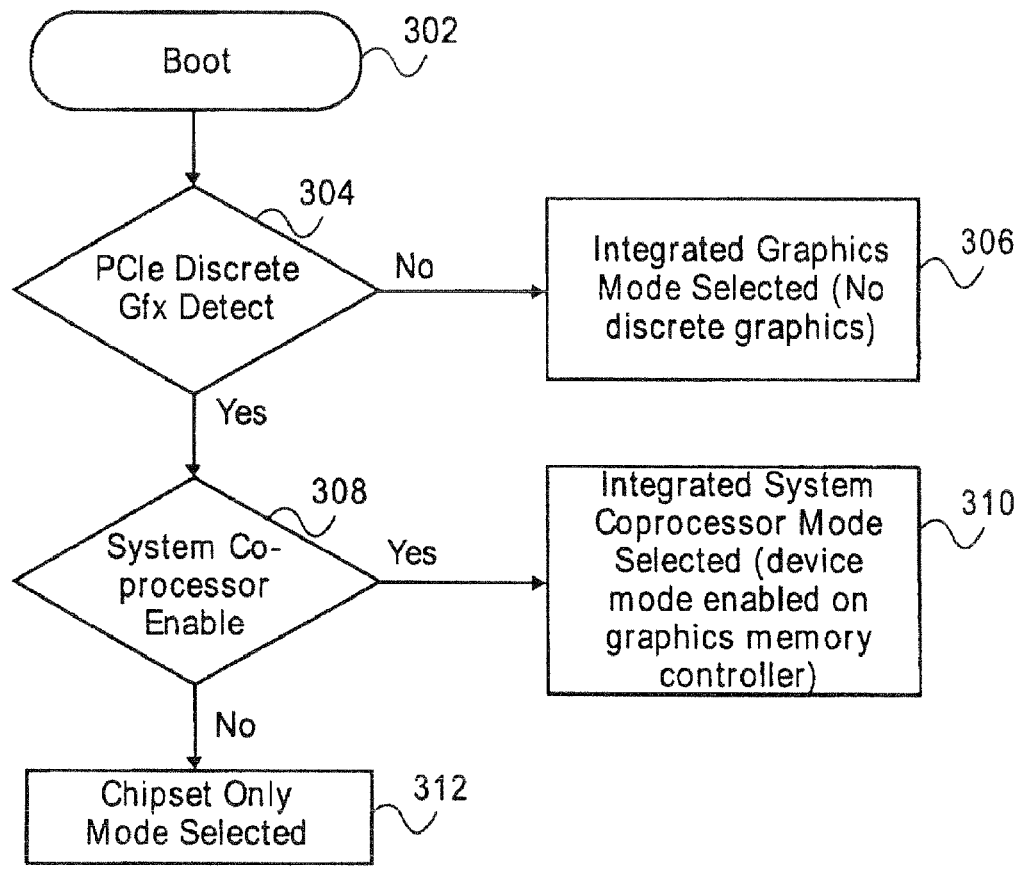
FIG. 3 is a flow chart illustrating a process of the driver model and how the device ID is selected.

FIG. 3 is a flow chart illustrating a process 300 of the driver model and how the device ID may be selected. The boot process is initially enabled (act 302). During boot up, it is determined whether a discrete graphics card is present or not (act 304). If there is no discrete graphics card detected, the integrated graphics engine on the chipset handles graphics functions (step 306).

If a discrete card is detected, it is determined whether the system co-processor is enabled (step 308). In a typical implementation, a fuse on the chipset indicates whether the co-processor mode is activated.

If an integrated co-processor mode is activated, the new device mode in the integrated chipset is enabled (step 310). The discrete graphics mode is enabled as well.

If the integrated co-processor mode is not activated, the chipset only mode is selected. In this case, the unified memory architecture for graphics to general purpose capability is not enabled.

Embodiments of the invention assist the host processor in accelerating media or other workloads across multiple product lines. Media is representative of one such implementation of embodiments of the invention. One skilled in the art will recognize that embodiments of the invention may be used in other implementations including but not limited to MPEG2 encode, transcode, video pre-processing (such as progressive interlace detection (3:2 pulldown), transcale, noise filter, etc.), encryption engine, and so forth.

Embodiments of the invention enable a system co-processor capability utilizing the engines in the chipset and using the driver model to extend the unified memory architecture model to cover more than the current graphics solution. By enabling the system co-processor capability, the base platform will be able to perform various functions. In particular, the general purpose capability may be used to enable a selectable device type (different personalities) based on the system configuration. Conventionally, this capability was limited to enable/disable of integrated graphics. Embodiments of the invention allow other capabilities beyond graphics such as media encode, game physics, and so forth. Additionally, the system unified memory architecture model is used for assisting the host processor for other functions, such as hardware acceleration, rather than being limited to graphics. Furthermore, a faster memory transfer protocol is provided in terms of dual mapped memory surfaces.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

Moreover, the acts in FIGS. 2 and 3 need not be implemented in the order shown, nor do all of the acts necessarily need to be performed. Also, those acts that are not dependent on other acts may be performed in parallel with the other acts. Further, at least some of the acts in this figure may be implemented as instructions, or groups of instructions, implemented in a machine-readable medium.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed is:

1. An apparatus comprising:
   a circuit; and
   a processor coupled to said circuit to determine whether a graphics card is present on said apparatus and, in the absence of said graphics card, to adapt said circuit to act as a graphics processor.

2. The apparatus of claim 1 wherein said circuit is chipset.

3. The apparatus of claim 1 wherein said processor to configure said circuit for another function other than a graphics processor function if said graphics card is present.

4. The apparatus of claim 3 wherein said processor to configure said circuit as a co-processor if said graphics card is present.

5. The apparatus of claim 1 wherein said processor to determine if a co-processor mode is enabled if a graphics processing capability is resident on said apparatus.

6. A non-transitory computer readable medium storing instructions to enable a processor to:
   determine whether a graphics card is present on a platform; and
   in response to the absence of the graphics card, adapt another circuit to act as a graphics processor.

7. The medium of claim 6 further storing instructions to adapt a chipset to act as a graphics processor in the absence of a graphics card.

8. The medium of claim 6 further storing instructions to configure said circuit for another function other than as a graphics processor if said graphics card is present.

9. The medium of claim 8 further storing instructions to configure said circuit as a co-processor if said graphics card is present.

10. The medium of claim 6 further storing instructions to determine if a co-processor mode is enabled if a graphics processing capability is resident on said apparatus.

11. A method comprising:
    determining whether a graphics card is present on a platform; and configuring a circuit on said platform for a function other than graphics processing if a graphics card is present on said platform.

12. The method of claim 11 including, in response to the absence of a graphics card, adapting said circuit to act as a graphics processor.

13. The method of claim 11 including adapting a chipset to act as a graphics processor in the absence of a graphics card.

14. The method of claim 11 including configuring said circuit if a co-processor of said graphics card is present.

15. The method of claim 11 including determining if a co-processor mode is enabled if a graphics processing capability is resident on said apparatus.

* * * * *